United States Patent
Kobayashi et al.

(10) Patent No.: US 9,313,426 B2
(45) Date of Patent: Apr. 12, 2016

(54) PHOTOELECTRIC CONVERSION DEVICE AND IMAGING SYSTEM

(71) Applicant: CANON KABUSHIKI KAISHA, Tokyo (JP)

(72) Inventors: Daisuke Kobayashi, Kawaguchi (JP); Yoshikazu Yamazaki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/936,548

(22) Filed: Jul. 8, 2013

(65) Prior Publication Data

US 2014/0015993 A1    Jan. 16, 2014

(30) Foreign Application Priority Data

Jul. 11, 2012 (JP) .................................. 2012-155529

(51) Int. Cl.
*H04N 5/335* (2011.01)
*H04N 5/232* (2006.01)
*H04N 5/376* (2011.01)

(52) U.S. Cl.
CPC ............. *H04N 5/3355* (2013.01); *H04N 5/232* (2013.01); *H04N 5/3765* (2013.01)

(58) Field of Classification Search
CPC . H04N 5/3765; H04N 5/37457; H04N 5/374; H04N 3/1506
USPC ............................ 348/301, 302, 308, E05.091
See application file for complete search history.

(56) References Cited

U.S. PATENT DOCUMENTS

| | | |
|---|---|---|
| 7,162,186 B2 | 1/2007 | Moritani |
| 7,697,879 B2 | 4/2010 | Watanabe et al. |
| 2002/0034394 A1 | 3/2002 | Matsuguma et al. |
| 2006/0115283 A1 | 6/2006 | Yamauchi et al. |
| 2008/0003019 A1 | 1/2008 | Kikuchi |
| 2010/0149394 A1* | 6/2010 | Yamazaki et al. ............. 348/308 |
| 2010/0259662 A1* | 10/2010 | Oike et al. ..................... 348/308 |
| 2010/0303480 A1 | 12/2010 | Stuckey et al. |

(Continued)

FOREIGN PATENT DOCUMENTS

| | | |
|---|---|---|
| CN | 101753864 A | 6/2010 |
| CN | 102387319 A | 3/2012 |

(Continued)

OTHER PUBLICATIONS

U.S. Appl. No. 13/936,519, filed Jul. 8, 2013, Kohei Matsuda.

*Primary Examiner* — Hung Lam
(74) *Attorney, Agent, or Firm* — Canon U.S.A., Inc. IP Division

(57) ABSTRACT

A photoelectric conversion device includes a pixel array including a plurality of pixels arranged in a matrix, and a plurality of signal processing units each associated with a respective one of columns of the pixel array and including an A/D conversion unit configured to convert a signal generated based on the pixels into a digital signal. The photoelectric conversion device further includes a plurality of groups each including a plural ones of signal processing units out of the plurality of signal processing units and a block output unit configured to receive outputs of the plural ones of signal processing units, and a driving signal transmission unit configured to transmit a driving signal for driving a plurality of the block output units. The driving signal transmission unit supplies, to one of the block output units and another of the block output units, the driving signal at respective different timings.

10 Claims, 6 Drawing Sheets

(56) References Cited

U.S. PATENT DOCUMENTS

| | | | |
|---|---|---|---|
| 2011/0037871 A1* | 2/2011 | Suzuki | 348/222.1 |
| 2011/0063488 A1 | 3/2011 | Nakazawa | |
| 2011/0074994 A1* | 3/2011 | Wakabayashi et al. | 348/302 |
| 2011/0216358 A1 | 9/2011 | Katou et al. | |
| 2012/0050593 A1* | 3/2012 | Kobayashi | H04N 5/378 348/302 |
| 2012/0195604 A1 | 8/2012 | Kakigi | |
| 2014/0036114 A1* | 2/2014 | Yoneda et al. | 348/247 |
| 2014/0098272 A1* | 4/2014 | Nakamura et al. | 348/308 |
| 2014/0160334 A1* | 6/2014 | Wakabayashi | 348/308 |

FOREIGN PATENT DOCUMENTS

| | | |
|---|---|---|
| CN | 102821257 A | 12/2012 |
| EP | 1566959 A2 | 8/2005 |
| JP | 2001-356655 A | 12/2001 |
| JP | 2003-323090 A | 11/2003 |
| JP | 2010-147684 A | 7/2010 |

\* cited by examiner

PHOTOELECTRIC CONVERSION DEVICE AND IMAGING SYSTEM

BACKGROUND

1. Technical Field

The present invention relates to a photoelectric conversion device, and, more particularly, to a photoelectric conversion device including a signal processing circuit associated with a respective one of columns of a pixel array.

2. Description of the Related Art

Imaging apparatuses for performing signal processing in parallel, the apparatuses having a signal processing circuit for each column in a pixel array or for a plurality of columns in the pixel array arranged in a matrix are known.

Japanese Patent Application Laid-Open No. 2010-147684 discusses an imaging apparatus having, as a signal processing device provided for each column in a pixel array, an analog-digital (A/D) conversion unit, and a memory for storing the conversion result, and a block output line for each block of a plurality of memories. A digital signal appearing on the block output line is transmitted to a latter stage in synchronization with a clock signal by a synchronization circuit.

Meanwhile, as a method for supplying a driving signal, a buffer circuit tree structure for connecting buffer circuits in a tree shape has been known.

Japanese Patent Application Laid-Open No. 2010-147684 has no description about how a signal for driving the signal processing circuits or the synchronization circuits is supplied. If it is assumed that, in the imaging apparatus discussed in Japanese Patent Application Laid-Open No. 2010-147684, the driving signal is supplied using the buffer circuit tree structure, the number of simultaneously operating buffer circuits increases, and this may cause an increase in transitional current consumption. The transitional increase in current consumption causes increase in voltage fluctuations due to impedance in a power supply line of the imaging apparatus. This may narrow the operation margin range of the imaging apparatus and increase the amount of noise.

SUMMARY

According to an aspect of the present disclosure, a photoelectric conversion device includes a pixel array including a plurality of pixels arranged in a matrix, and a plurality of signal processing units each associated with a respective one of columns of the pixel array and including an A/D conversion unit configured to convert a signal generated based on the plurality of pixels into a digital signal. The photoelectric conversion device further includes a plurality of groups each including a plural ones of signal processing units out of the plurality of signal processing units, and a block output unit configured to receive outputs of the plural ones of signal processing units, and a driving signal transmission unit configured to transmit a driving signal for driving a plurality of the block output units. The driving signal transmission unit supplies, to one of the block output units and another of the block output units, the driving signal at respective different timings.

According to another aspect of the present disclosure, a photoelectric conversion device including a pixel array including a plurality of pixels arranged in a matrix, and a plurality of signal processing units each associated with a respective one of columns of the pixel array and including an A/D conversion unit configured to convert a signal generated based on the plurality of pixels into a digital signal. The photoelectric conversion device further includes a plurality of groups each including a plural ones of signal processing units out of the plurality of signal processing units, and a block output unit configured to receive outputs of the plural ones of signal processing units, and a driving signal transmission unit configured to transmit a driving signal for driving a plurality of the block output units. The driving signal transmission unit includes a first buffer circuit group including a plurality of buffer circuits connected in series with each other, each of the plurality of buffer circuits is associated with a respective one of the plurality of groups, and an output of each of the plurality of buffer circuits is given to the plurality of signal processing units of the associated group.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

Figure 1:
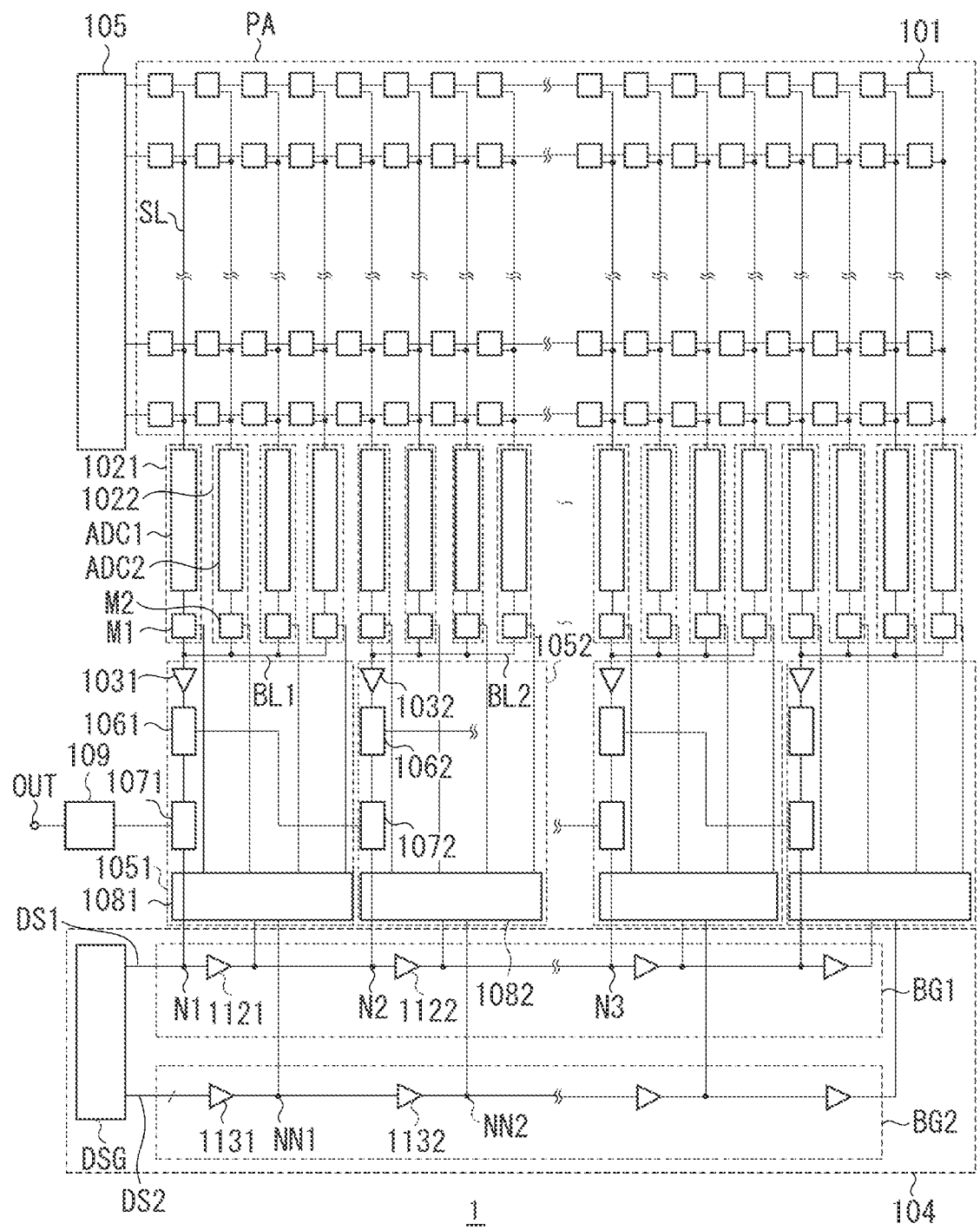
FIG. 1 is a block diagram illustrating a configuration of a photoelectric conversion device according to a first exemplary embodiment.

FIG. 1 is a block diagram illustrating a configuration of a photoelectric conversion device 1 according to a first exemplary embodiment of the present invention. The photoelectric conversion device 1 includes a pixel array PA, a plurality of signal processing units 102n, a plurality of block output units 105n, a driving signal transmission unit 104, and a row selection unit 105 (n indicates an integer of one or more). Hereinafter, in descriptions of a plurality of the same elements, n is added or the last one digit is omitted. For example, the signal processing units are expressed as 102n or 102.

The pixel array PA includes a plurality of pixels 101 that are arranged in a matrix. For each column, a signal line SL is provided. The pixel 101, when selected by a control signal given by the row selection unit 105, outputs a signal to a corresponding signal line SL. In the exemplary embodiment, the row selection unit 105 selects a row of the pixels 101 included in the pixel array PA as a unit. Generally, the row selection unit 105 supplies two or more control signals to the pixels of one row. In the exemplary embodiment, for the sake of simplicity, the lines are expressed by one line in FIG. 1.

The signal processing unit 102n are provided corresponding to columns in the pixel array PA. Each of the signal processing unit 102n includes an A/D conversion unit for converting a signal appearing on the signal line SL into a digital signal. The signal processing unit 102 may include a noise reduction circuit or an amplifier for signal amplification. In such a case, a signal is amplified after noise reduction is performed on the signal output from one of the pixels 101. A digital signal having a high signal-to-noise (S/N) ratio may be obtained by inputting the amplified signal after noise reduction. The noise reduction circuit includes, for example, a correlated double sampling (CDS) circuit. The amplifier includes, for example, an operational amplifier, a source follower circuit, and a common-source amplifier. The signal processing units 102n may include memory units Mn for storing digital signals output from the A/D conversion units.

The block output units 105n will be described. In FIG. 1, for four signal processing units 102, one block output line and one block output unit are provided. In other words, one block includes four signal processing units 102, and to each block, the block output unit 105n is provided. An output from the signal processing units 102n is given to the block output line BL. The block output line is connected to an input terminal of the block output unit. The block output unit 105n includes a signal selection unit 106n, a synchronization circuit 107n, and a column selection unit 108n. FIG. 1 illustrates a configuration that the block output unit 105n further includes a buffer circuit unit 103n for buffering a digital signal output to the block output line BLn. The signal selection unit 106n transmits the digital signal output to the block output line BLn to the synchronization circuit 107n. The synchronization circuit 107n transmits, in synchronization with a driving signal described below, the digital signal to the signal selection unit 106n of another block. The signal selection unit 106n selectively outputs, to the synchronization circuit 107n in the same block, one of the signals output to the block signal line BL in the same block as the signal selection unit 106n and the signal output from the synchronization circuit 107(n+1) in another block. In other words, in FIG. 1, except for the block in which the synchronization circuit 107n is connected to the digital signal processing unit 109, the signal output to each block signal line BL is transmitted to the digital signal processing unit 109 via the signal selection unit 106 and the synchronization circuit 107 in another block. The column selection unit 108n supplies a control signal to the signal processing units 102 to output a digital signal to the block signal line BLn. The column selection unit 108n is, for example, a decoder or a shift register.

The driving signal transmission unit 104 includes a driving signal generation unit DSG, and buffer circuit groups BG1 and BG2 as first and second buffer circuit groups. Each of the buffer circuit groups BG1 and BG2 includes a buffer circuit group including a plurality of buffer circuits connected with each other in series. FIG. 1 illustrates a configuration including two sets of the buffer circuits connected in series. The buffer circuit group BG1 includes buffer circuits 1121, 1122, . . . , and 112n. The buffer circuit group BG2 includes buffer circuits 1131, 1132, . . . , and 113n.

A driving signal DS1 transmitted by the buffer circuit group BG1 is given to the synchronization circuit 107n and the buffer circuit 112n. The synchronization circuit 107n outputs, in synchronization with a driving signal DS1, to a following stage, that is, the signal selection unit 106(n−1) in another block or the digital signal processing unit 109. The buffer circuit 112n supplies the driving signal DS1 to a buffer circuit of the following stage and the synchronization circuit 107(n+1) in another block. In the configuration illustrated in FIG. 1, the synchronization circuit 107n and column selection unit 108n in an adjacent block are driven at a timing delayed by the buffer circuit 112n.

A driving signal DS2 transmitted by the buffer circuit group BG2 is given to the column selection unit 108n in each block. The column selection unit 108n becomes an active state in synchronization with the driving signal DS2. In other words, a column selection unit 108n to which the driving signal DS1 for activating the unit is given, out of the column selection units 108n that have entered the active state in synchronization with the driving signal DS2, supplies a column selection signal to the signal processing unit 102n. By the operation, the block output unit 105n in a block associated with the column selection unit 108n outputs the digital signal to the signal selection unit 106 in another block or the digital signal processing unit 109.

The driving signal transmission unit 104 supplies a driving signal such that at least adjacent block output units 105 operate at different timings. As illustrated in FIG. 1, when the buffer circuit groups are used, if the circuit characteristics of each buffer circuit are equivalent to each other, the individual blocks may operate with a predetermined phase difference. This may suppress the increase in transitional power consumption and noise, which conventionally needs to be solved.

Figure 2:
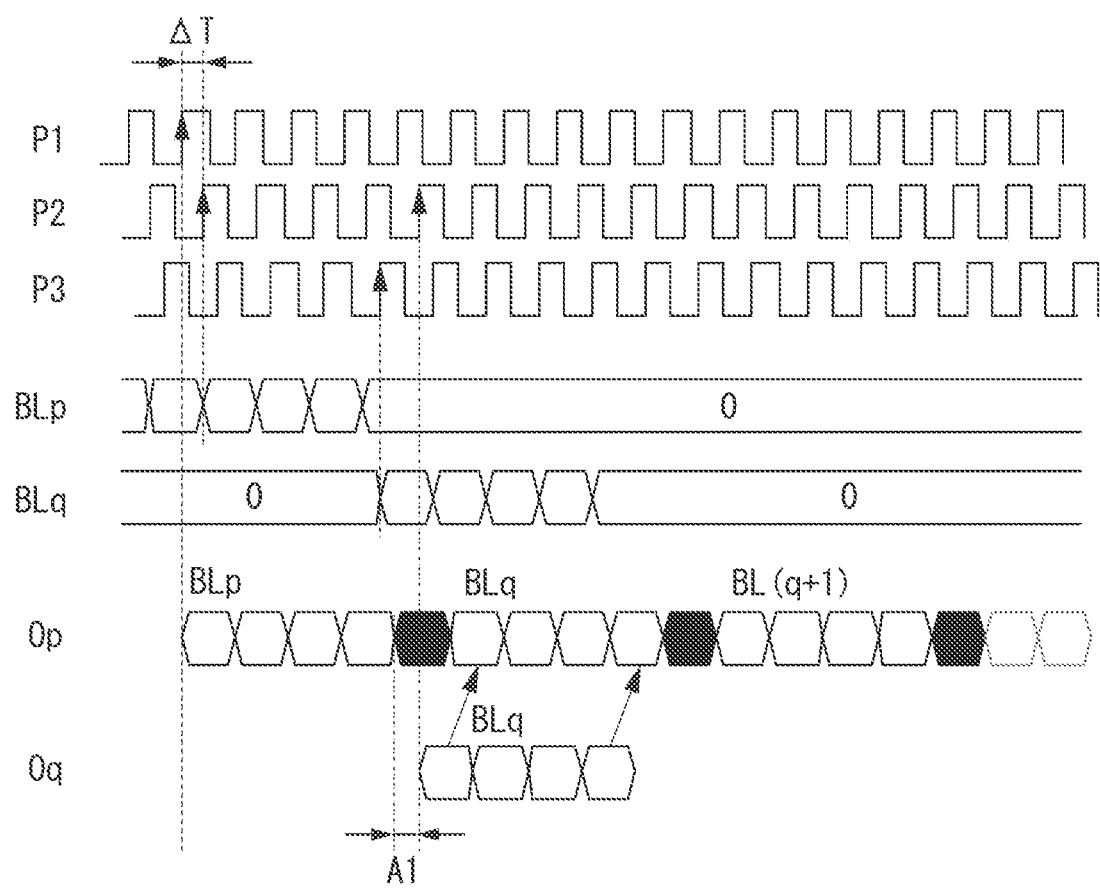
FIG. 2 is a timing diagram illustrating an operation of the photoelectric conversion device according to the first exemplary embodiment.

With reference to FIG. 2, an operation according to the exemplary embodiment will be described. FIG. 2 is a timing diagram illustrating operation timings of a synchronization circuit 107p that is the p-th synchronization circuit 107 from the left in FIG. 1, a synchronization circuit 107q that is the q-th synchronization circuit 107, a column selection unit 108p that corresponds to the synchronization circuit 107p, and the column selection unit 108q that corresponds to the synchronization circuit 107q (p and q are natural numbers satisfying p<q).

A signal P1 indicates the driving signal DS1 transmitted to a node N1 in the buffer circuit group BG1 in FIG. 1. Similarly, signals P2 and P3 correspond to nodes N2 and N3, respectively. In the exemplary embodiment, the driving signal DS1 is a periodic clock signal.

Although not illustrated in FIG. 2, at least in a period the signal is being output, the column selection units 108p and 108q are in the active state according to a driving signal DS2 given via the buffer circuit group BG2.

Data BLp and BLq are data output from the signal processing units 102 to the block signal lines BL of the p-th block from the left-hand side and the q-th block from the left-hand side respectively.

Output signals Op and Oq are output from the synchronization circuits 107 of the p-th and q-th blocks, respectively. The black data in the output signals Op and Oq is invalid data. The characters provided above the white data indicate the block signal line from which the data is output.

Hereinafter, a case where p=1, and q=2 will be described. As will be understood from FIG. 1, the driving signal DS1 supplied to the synchronization circuit and the column selection unit 108 of an adjacent block is transmitted via the buffer circuit 112. Consequently, the phase of the driving signal DS1 supplied to the second block delays, from the first block from the left, by a delay ΔT generated in the buffer circuit 112. While the column selection unit 1081 corresponding to the first block operates in synchronization with the signal P2, the synchronization circuit 1071 corresponding to the first block operates in synchronization with the signal P1. The column selection unit 1082 corresponding to the second block operates in synchronization with the signal P3, and the synchronization circuit 1072 corresponding to the second block operates in synchronization with the signal P2.

Since the column selection unit 1081 of the first block operates in synchronization with the signal P2, the data is output at a synchronized timing with the signal P2 to the block signal line BL1 of the first block. The synchronization circuit 1071 of the first block synchronizes with the signal P1, and the data output to the block signal line BL1 in synchronization with the signal P2 is output to the digital signal processing unit 109 in synchronization with the signal P2.

Similarly, since the column selection unit 1082 of the second block operates in synchronization with the signal P3, the data is output at a synchronized timing with the signal P3 to the block signal line BL2 of the second block. The synchronization circuit 1072 of the second block synchronizes with the signal P2, and the data output to the block signal line BL2 in synchronization with the signal P3 is output to the signal selection unit 1061 in synchronization with the signal P2. During the period A1 in FIG. 2, in response to a control signal (not illustrated), the signal selection unit 1061 performs switching such that the output of the synchronization circuit 1072 is output to the synchronization circuit 1071, instead of the block signal line BL1. By the processing, the data output to the block signal line BL2 is output, in synchronization with the signal P1, from the synchronization circuit 1071 (Op).

As a result of the above-described operation, the data output from the synchronization circuit 1071 is to include periodic invalid data. The invalid data is generated between data output from two different block signal lines. In other words, although the phase delays, data output from a plurality of blocks may maintain the phase relationship in the individual blocks. Consequently, this allows an easy phase management of the driving signals of the synchronization circuit 107$n$ and the column selection unit 108$n$ and the data output from the signal processing unit 102. Further, since the driving signals are delayed by the buffer circuit groups, the circuit operation timings may be shifted among the different blocks. As a result, reduction in transitional power consumption and reduction in noise due to power fluctuation may be achieved.

In FIG. 1, the driving signal DS1 output from the driving signal generation unit DSG is directly given to the synchronization circuit 1071. Alternatively, a buffer circuit may be provided between the driving signal generation unit DSG and the node N1. Meanwhile, the driving signal DS2 is given to the column selection unit 1081 via the buffer circuit 1131. Alternatively, the driving signal DS2 output from the driving signal generation unit DSG may be directly given to the column selection unit 1081.

Hereinafter, a second exemplary embodiment of the present invention will be described with reference to the attached drawings. Differences between the first exemplary embodiment will be mainly described.

Figure 3:
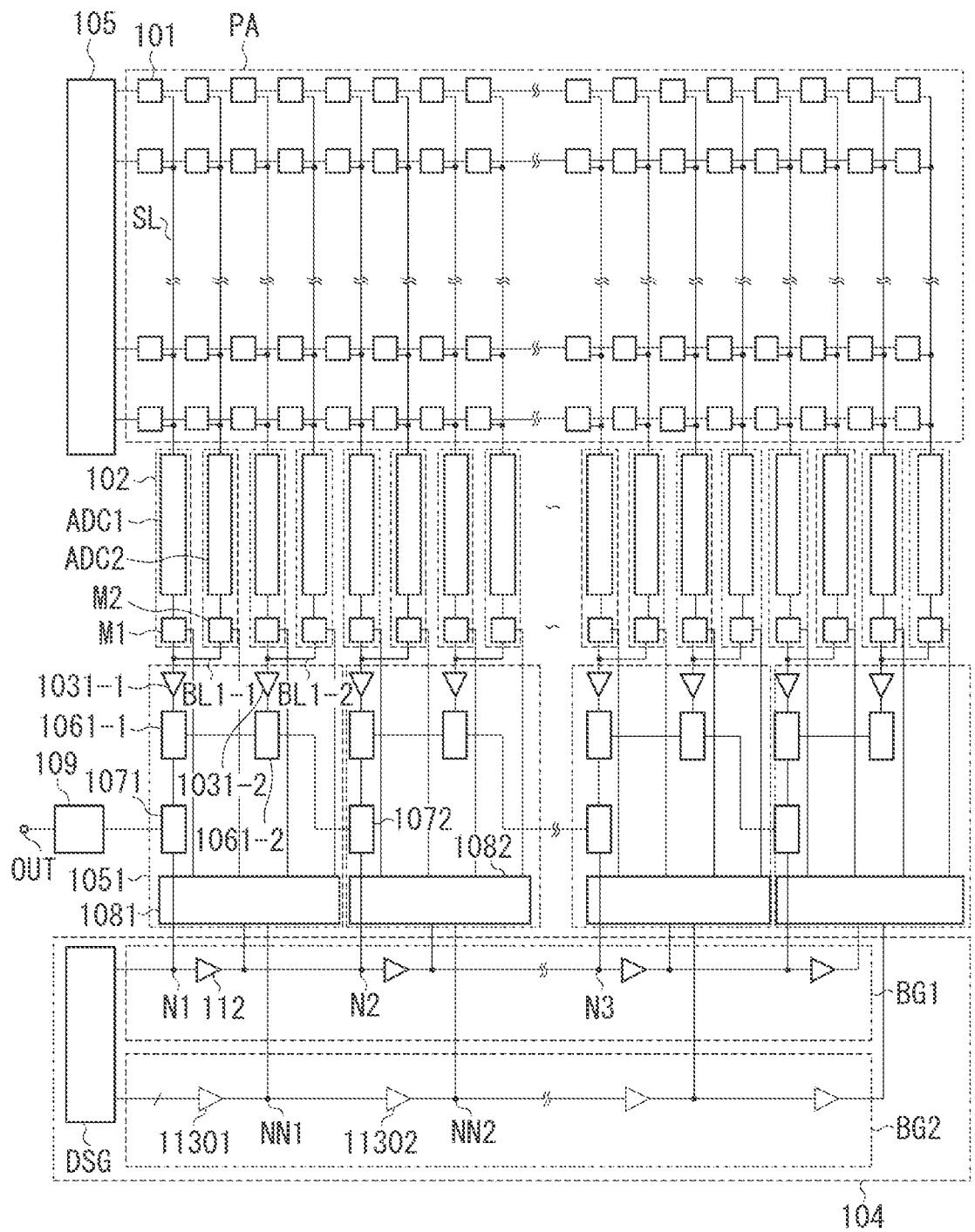
FIG. 3 is a block diagram illustrating a configuration of a photoelectric conversion device according to a second exemplary embodiment.

FIG. 3 is a block diagram illustrating a configuration of a photoelectric conversion device according to the exemplary embodiment. The same reference numerals are applied to elements having functions similar to those in the first exemplary embodiment. The photoelectric conversion device illustrated in FIG. 1 is provided with the synchronization circuit 107$n$ to each block signal line.

The photoelectric conversion device according to the exemplary embodiment is different from that in the first exemplary embodiment in that one synchronization circuit is provided to a plurality of block signal lines.

In the configuration according to the exemplary embodiment, a plurality of blocks are driven by the same driving signal. In other words, for a plurality of blocks driven by the same driving signal, one synchronization circuit is provided.

With the configuration according to the exemplary embodiment, the block signal line may be shortened, and this may reduce loads on the drive of the signal processing units 102. Consequently, the operation may speed up as compared with the configuration according to the first exemplary embodiment.

A third exemplary embodiment of the present invention will be described with reference to the attached drawings. Differences between the first exemplary embodiment will be mainly described.

Figure 4:
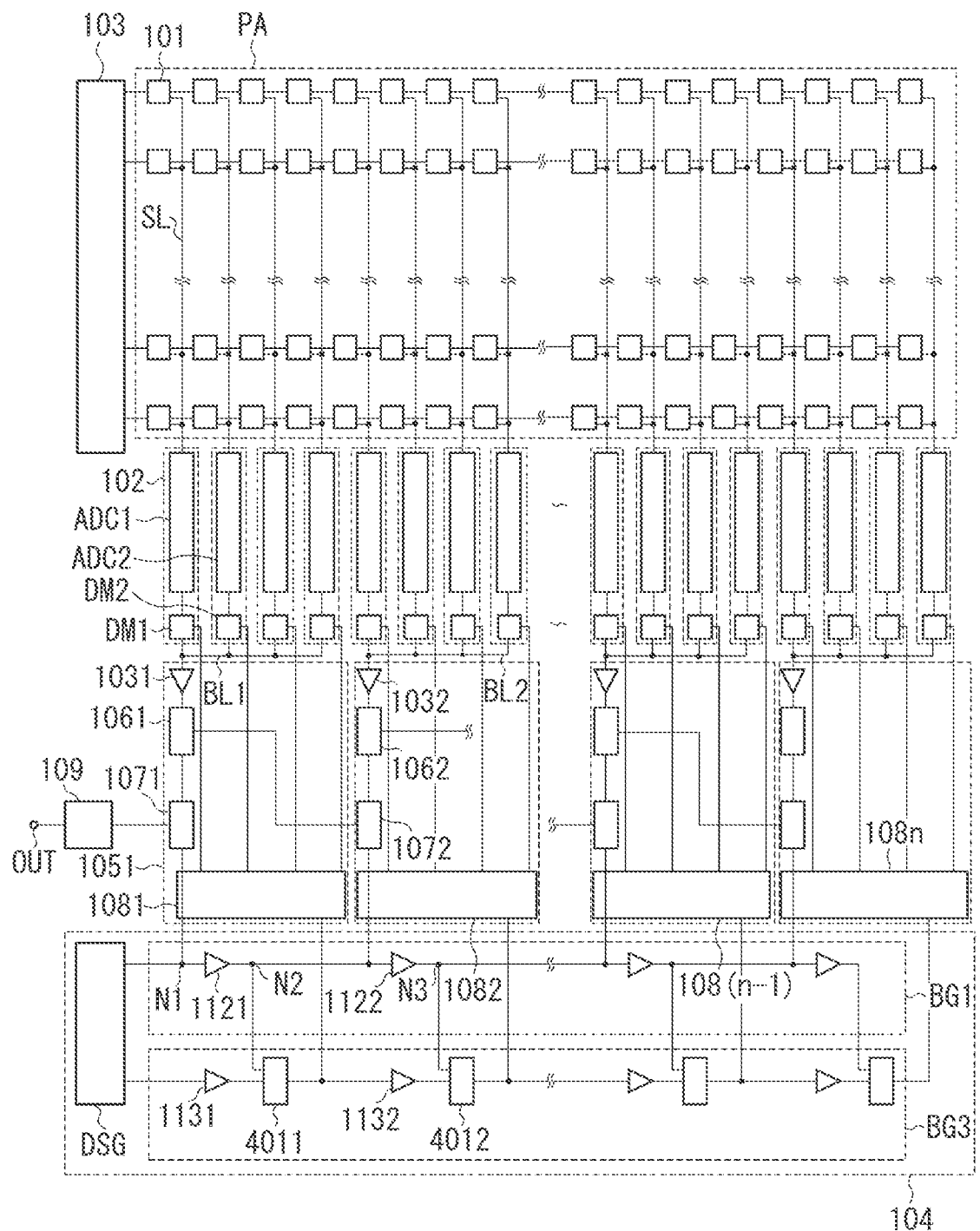
FIG. 4 is a block diagram illustrating a configuration of a photoelectric conversion device according to a third exemplary embodiment.

FIG. 4 is a block diagram illustrating a configuration of a photoelectric conversion device according to the exemplary embodiment. The column selection unit 108 is, for example, a decoder. A driving signal transmission unit 104 supplies a clock signal for driving the synchronization circuits 107 and address data for selecting the column selection unit 108. A driving signal supply unit includes, in addition to the buffer circuit group BG1 for transmitting a clock signal, the group BG1 including a plurality of buffer circuits 112$n$ connected in series with each other, a buffer circuit group BG3 for transmitting address data, the group BG3 including the buffer circuits 113$n$ and address data synchronization circuits 401 connected alternately. The address data synchronization circuit 401 synchronizes address data given from the buffer circuits 113$n$ with a clock signal transmitted by the buffer circuit group BG1, and supplies the data to the buffer circuit 113($n$+1) of the next stage. In the exemplary embodiment, the buffer circuit group BG3 functions as a second buffer circuit group.

According to the exemplary embodiment, the introduction of the address data synchronization circuit 401 for synchronizing the transmission of address data with the signal for driving the synchronization circuits 107 allows an easy phase management between blocks and within a block.

A fourth exemplary embodiment of the present invention will be described with reference to the attached drawings. Differences between the first exemplary embodiment will be mainly described.

Figure 5:
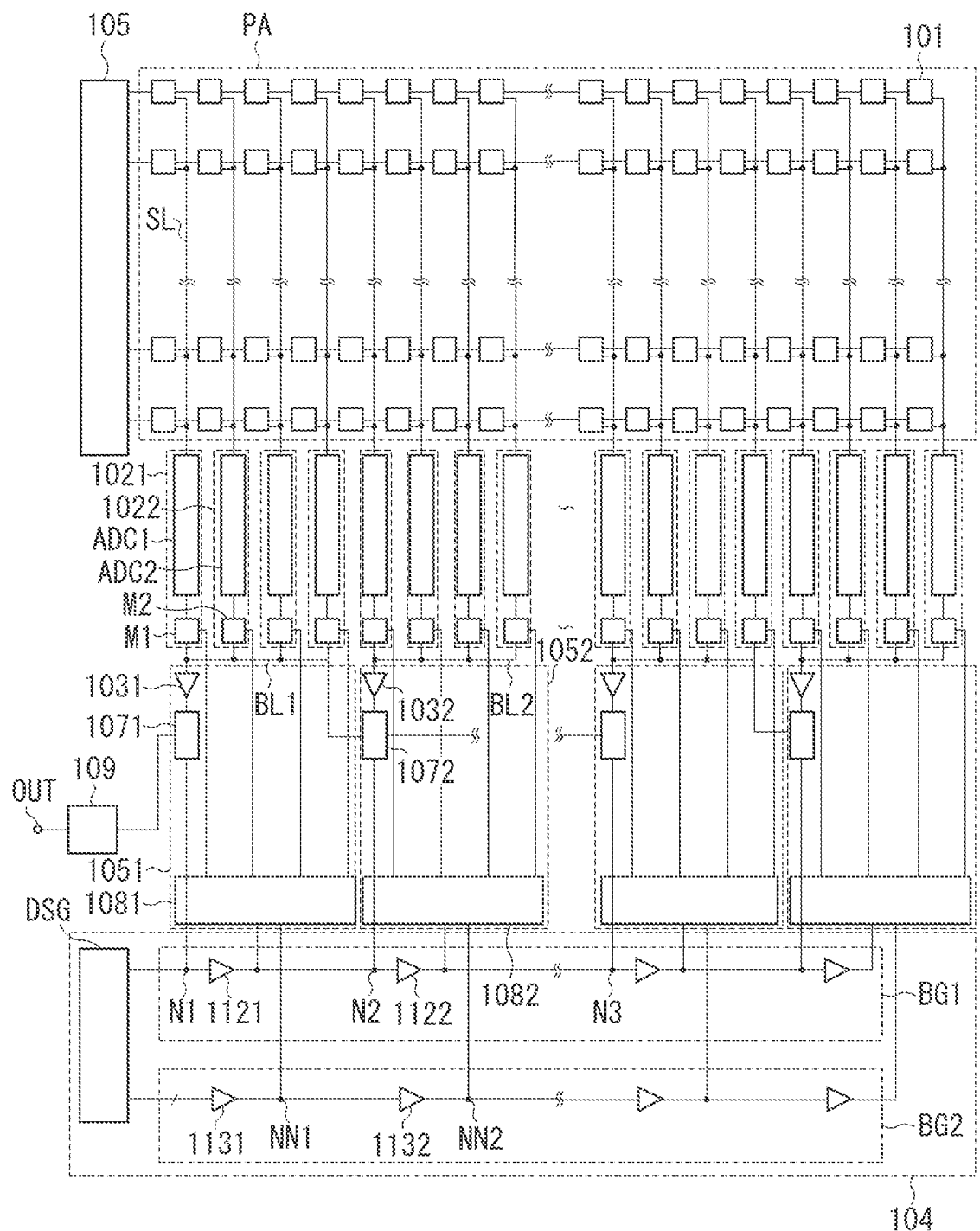
FIG. 5 is a block diagram illustrating a configuration of a photoelectric conversion device according to a fourth exemplary embodiment.

FIG. 5 is a block diagram illustrating a configuration of a photoelectric conversion device according to the exemplary embodiment. The exemplary embodiment is different from the first exemplary embodiment in that the signal selection units 106$n$ are not provided. A signal output to the block output line BLn is connected to another block output line via the synchronization circuits 107$n$.

By the configuration, the block output line BLn is used also as a line for connecting the synchronization circuits 107$n$, and consequently, it is effective in miniaturizing the area of the photoelectric conversion device.

A fifth exemplary embodiment of the present invention will be described with reference to the attached drawings.

Figure 6:
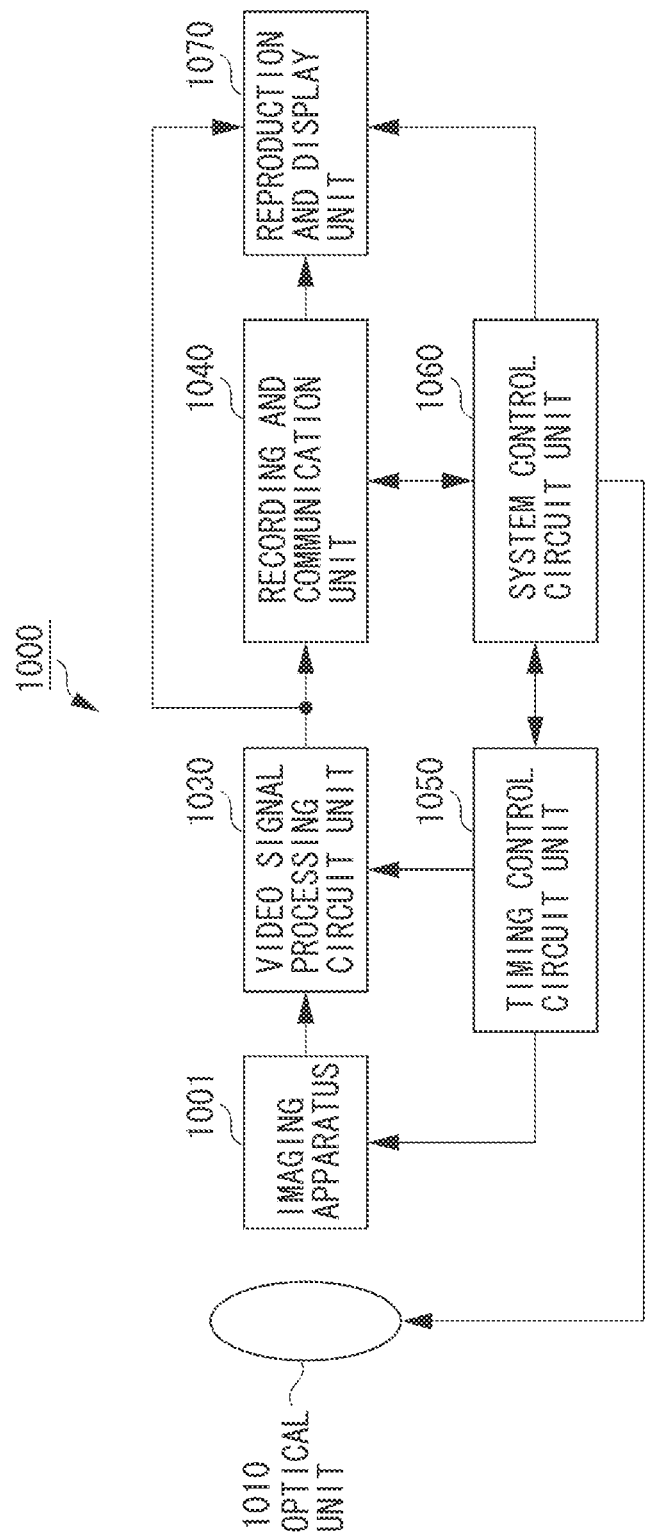
FIG. 6 is a block diagram illustrating a configuration of an imaging apparatus according to a fifth exemplary embodiment.

FIG. 6 is a block diagram illustrating a configuration of an imaging system.

An imaging system 1000 includes, for example, an optical unit 1010, an imaging apparatus 1001, a video signal processing circuit unit 1030, a recording and communication unit 1040, a timing control circuit unit 1050, a system control circuit unit 1060, and a reproduction and display unit 1070. As the imaging apparatus 1001, the photoelectric conversion devices according to the above-described exemplary embodiments are employed.

The optical unit 1010 that is an optical system including lenses concentrates light from an object on a pixel array, which is formed of two-dimensionally arranged pixels, in the imaging device 1001, to form an image of the object. The imaging device 1001 outputs, at a timing according to a signal from the timing control circuit unit 1050, a signal corresponding to the light concentrated on the pixel portion.

The signal output from the imaging device 1001 is input to the video signal processing circuit unit 1030 that serves as a video signal processing unit. Then, the video signal processing circuit unit 1030 performs, according to a method specified by a program or the like, processing such as correction on the input electric signal. The signal obtained by the processing in the video signal processing circuit unit is transmitted as image data to the recording and communication unit 1040. The recording and communication unit 1040 transmits a signal for forming an image to the reproduction and display unit 1070, and instructs the reproduction and display unit 1070 to reproduce and display moving images or still images. Further, the recording and communication unit 1040 receives a signal from the video signal processing circuit unit 1030 to communicate with the system control circuit unit 1060. Further, the recording and communication unit performs an operation for recording a signal for forming an image on a recording medium (not illustrated).

The system control circuit unit 1060 performs overall control of the operation of the imaging system. The system control circuit unit 1060 controls drive of the optical unit 1010, the timing control circuit unit 1050, the recording and communication unit 1040, and the reproduction and display unit 1070. The system control circuit unit 1060 includes a storage device (not illustrated) that is, for example, a recording medium. The system control circuit unit 1060 records a program, and the like necessary for the control of the operation of the imaging system in the storage device. Further, the system control circuit unit 1060, for example, supplies, in the imaging system, a signal for switching between drive modes depending on the user's operation. Specifically, the system control circuit unit 1060 controls the change of lines to be read or reset, the change of angles due to electronic zoom, and the change of angles due to electronic image stabilization.

The timing control circuit unit 1050 controls the drive timing of the imaging apparatus 1001 and the video signal processing circuit unit 1030 based on the control by the system control circuit unit 1060 that serves as a control unit.

The above-described exemplary embodiments are only examples for implementing the present invention, and within the scope of the present invention, a part of the exemplary embodiments may be changed, or the exemplary embodiments may be combined.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims from the benefit of Japanese Patent Application No. 2012-155529 filed Jul. 11, 2012, which is hereby incorporated by reference herein in its entirety.

What is claimed is:

1. A photoelectric conversion device comprising:
a pixel array including a plurality of pixels arranged in a matrix; and
a plurality of signal processing units, each associated with a respective one of columns of the pixel array and including an A/D conversion unit configured to convert a signal generated based on at least one of the plurality of pixels into a digital signal,
wherein the photoelectric conversion device further comprises:
plurality of signal processing groups each including a plural ones of signal processing units out of the plurality of signal processing units, each signal processing group associated with a respective block output unit configured to receive outputs of only the signal processing units belonging to the same signal processing group; and
a driving signal transmission unit configured to transmit a driving signal for driving a plurality of the block output units, and
wherein the driving signal transmission unit supplies, to one of the block output units and another of the block output units, the driving signal at respective different timings,
wherein the driving signal transmission unit includes a first buffer circuit group including a plurality of buffer circuits connected in series with each other,
wherein each of the plurality of buffer circuits is associated with a respective one of the plurality of signal processing groups, and
wherein an output of each of the plurality of buffer circuits is given to the block output unit associated with the signal processing group associated with the buffer circuit.

2. The photoelectric conversion device according to claim 1, wherein the driving signal transmission unit further includes a second buffer circuit group,
wherein the second buffer circuit group includes a plurality of buffer circuits and synchronization circuits, and
wherein the plurality of synchronization circuits synchronizes the outputs of the buffer circuits included in the second buffer circuit group with the outputs of the buffer circuits included in the first buffer circuit group.

3. The photoelectric conversion device according to claim 2, further comprising:
a plurality of column selection units each associated with a respective one of the plurality of groups and configured to select the plurality of signal processing units included in the associated group,
wherein a signal from each of the plurality of buffer circuits included in the second buffer circuit group is given to a respective one of the plurality of column selection units.

4. The photoelectric conversion device according to claim 1, wherein the block output unit outputs a signal output from the associated plural ones of signal processing units or a signal output from another of the block output units.

5. The photoelectric conversion device according to claim 1, wherein the block output unit outputs a signal in synchronization with the driving signal.

6. The photoelectric conversion device according to claim 1, the signal processing unit further including:
a memory unit configured to store a digital signal output from the A/D conversion unit; and
a selection unit configured to select the memory unit.

7. A photoelectric conversion device comprising:
a pixel array including a plurality of pixels arranged in a matrix; and
a plurality of signal processing units each associated with a respective one of columns of the pixel array and including an A/D conversion unit configured to convert a signal generated based on the plurality of pixels into a digital signal,
wherein the photoelectric conversion device further comprises:
a plurality of groups each including a plural ones of signal processing units out of the plurality of signal processing units, and a block output unit configured to receive outputs of the plural ones of signal processing units; and a driving signal transmission unit configured to transmit a driving signal for driving a plurality of the block output units, wherein the driving signal transmission unit includes a first buffer circuit group including a plurality of buffer circuits connected in series with each other, wherein each of the plurality of buffer circuits is associated with a respective one of the plurality of groups, and wherein an output of each of the plurality of buffer circuits is given to the block output unit associated with the signal processing group associated with the buffer circuit.

8. An imaging system comprising:
a photoelectric conversion device;
an optical system configured to form an image on a plurality of pixels; and
a video signal processing unit configured to process a signal output from the photoelectric conversion device to generate image data,
wherein the photoelectric conversion device comprises:
a pixel array including the plurality of pixels arranged in a matrix; and
a plurality of signal processing units, each associated with a respective one of columns of the pixel array and including an A/D conversion unit configured to convert a signal generated based on at least one of the plurality of pixels into a digital signal,
wherein the photoelectric conversion device further comprises:
a plurality of signal processing groups each including a plural ones of signal processing units out of the plurality of signal processing units, each signal processing group associated with a respective block output unit configured to receive outputs of only the signal processing units belonging to the same signal processing group; and
a driving signal transmission unit configured to transmit a driving signal for driving a plurality of the block output units, and
wherein the driving signal transmission unit supplies, to one of the block output units and another of the block output units, the driving signal at respective different timings,
wherein the driving signal transmission unit includes a first buffer circuit group including a plurality of buffer circuits connected in series with each other,
wherein each of the plurality of buffer circuits is associated with a respective one of the plurality of signal processing groups, and
wherein an output of each of the plurality of buffer circuits is given to the block output unit associated with the signal processing group associated with the buffer circuit.

9. A photoelectric conversion device comprising:
a pixel array including a plurality of pixels arranged in a matrix; and
a plurality of signal processing units, each associated with a respective one of columns of the pixel array and including an A/D conversion unit configured to convert a signal generated based on at least one of the plurality of pixels into a digital signal,
wherein the photoelectric conversion device further comprises:
a plurality of signal processing groups each including a plural ones of signal processing units out of the plurality of signal processing units;
a plurality of selection units, each of the selection units being disposed to correspond to one of the plurality of signal processing groups, and being configured to select the plurality of signal processing units in the corresponding one of the plurality of signal processing groups in order, and
a driving signal transmission unit configured to transmit a driving signal for driving the plurality of selection units;
wherein the driving signal transmission unit includes a buffer circuit group including a plurality of buffer circuits connected in series with each other,
wherein each of the plurality of buffer circuits is associated with a respective one of the plurality of selection units, and
wherein an output of each of the plurality of buffer circuits is given to the plurality of selection units of the associated signal processing group.

10. An imaging system comprising:
a photoelectric conversion device;
an optical system configured to form an image on the plurality of pixels; and
a video signal processing unit configured to process a signal output from the photoelectric conversion device to generate image data,
wherein
a pixel array including a plurality of pixels arranged in a matrix; and
a plurality of signal processing units, each associated with a respective one of columns of the pixel array and including an A/D conversion unit configured to convert a signal generated based on at least one of the plurality of pixels into a digital signal,
wherein the photoelectric conversion device further comprises:
a plurality of signal processing groups each including a plural ones of signal processing units out of the plurality of signal processing units;
a plurality of selection units, each of the selection units being disposed to correspond to one of the plurality of signal processing groups, and being configured to select the plurality of signal processing units in the corresponding one of the plurality of signal processing groups in order, and
a driving signal transmission unit configured to transmit a driving signal for driving the plurality of selection units;
wherein the driving signal transmission unit includes a buffer circuit group including a plurality of buffer circuits connected in series with each other,
wherein each of the plurality of buffer circuits is associated with a respective one of the plurality of selection units, and
wherein an output of each of the plurality of buffer circuits is given to the plurality of selection units of the associated signal processing group.

* * * * *